(12) United States Patent
Ekman et al.

(10) Patent No.: US 8,689,708 B2
(45) Date of Patent: Apr. 8, 2014

(54) METHOD AND DEVICE FOR COMBUSTION OF SOLID FUEL

(75) Inventors: Tomas Ekman, Risvägen (SE); Anders Lugnet, Ösbylund (SE)

(73) Assignee: AGA AB, Lidingö (SE)

( * ) Notice: Subject to any disclaimer, the term of this patent is extended or adjusted under 35 U.S.C. 154(b) by 650 days.

(21) Appl. No.: 12/988,858

(22) PCT Filed: Apr. 22, 2009

(86) PCT No.: PCT/SE2009/050412
§ 371 (c)(1),
(2), (4) Date: Dec. 22, 2010

(87) PCT Pub. No.: WO2009/131532
PCT Pub. Date: Oct. 29, 2009

(65) Prior Publication Data
US 2011/0091823 A1    Apr. 21, 2011

(30) Foreign Application Priority Data

Apr. 22, 2008   (SE) .................................... 0800919

(51) Int. Cl.
*F23D 1/00*    (2006.01)
*F23K 3/02*    (2006.01)
*F23L 7/00*    (2006.01)

(52) U.S. Cl.
USPC ........ 110/104 B; 110/261; 110/263; 110/297; 110/347; 110/348

(58) Field of Classification Search
CPC ..... F23D 11/10; F23D 11/101; F23D 11/102; F23D 11/103; F23D 11/104; F23D 11/106; F23D 11/107; F23D 11/108; F23D 11/12; F23D 11/14; F23D 11/16; F23D 11/18; F23D 11/20; F23D 2900/14681; F23C 2203/30; F23L 7/005; F23L 2900/07009
USPC ............ 110/263, 264, 265, 104 B, 261, 262, 110/297, 347, 348
See application file for complete search history.

(56) References Cited

U.S. PATENT DOCUMENTS 2,413,434 A * 12/1946 Cottrell .................... 110/262
4,067,682 A *  1/1978 Lado ......................... 431/11
(Continued)

FOREIGN PATENT DOCUMENTS

EP   0328794 A1   8/1989
EP   0413309 A2   2/1991
(Continued)

OTHER PUBLICATIONS

International Search Report, dated Jul. 3, 2009, from corresponding PCT application.

*Primary Examiner* — Kenneth Rinehart
*Assistant Examiner* — David J Laux
(74) *Attorney, Agent, or Firm* — Young & Thompson

(57) ABSTRACT

Method and device for combusting a solid phase fuel, where the fuel is caused, by the help of a non-pneumatic feeding element (11), to be fed to an inlet opening (11a) in a burner device (10), where the burner device (10) includes a first inlet (13a) for the oxidant through which an oxidant is caused to flow via a first supply conduit (13). The first inlet (13a) for oxidant is arranged in the form of a first opening arranged by the inlet opening, through which the oxidant is caused to flow out, through a burner pipe (16) and out through a burner orifice (17) to a combustion space (18), so that the oxidant by ejector action causes the fuel to be conveyed through the burner pipe and out through the burner orifice (17), and water vapour is added to the oxidant before the oxidant reacts with the fuel.

16 Claims, 2 Drawing Sheets

(56) References Cited

U.S. PATENT DOCUMENTS

Figure 1:
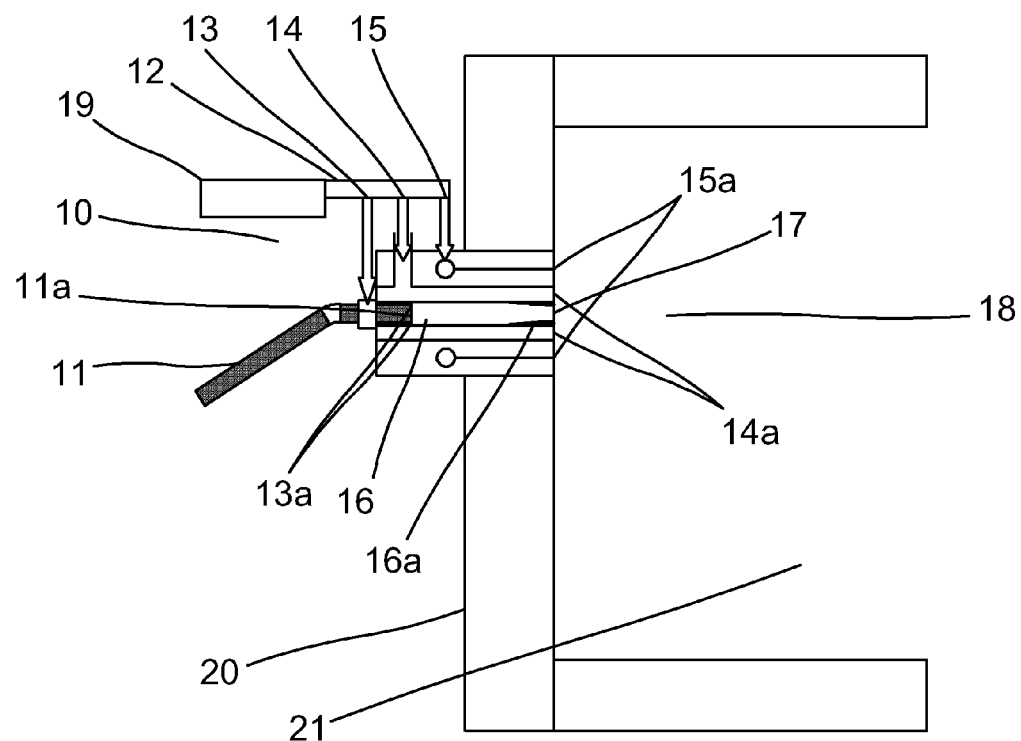

| | | | |
|---|---|---|---|
| 4,096,808 A * | 6/1978 | Trickel | 110/244 |
| 4,152,108 A * | 5/1979 | Reed et al. | 431/188 |
| 4,428,309 A * | 1/1984 | Chang | 110/262 |
| 4,546,710 A * | 10/1985 | Cremer | 110/263 |
| 4,803,836 A * | 2/1989 | Blanton et al. | 110/110 |
| 6,085,674 A | 7/2000 | Ashworth | |
| 6,206,949 B1 | 3/2001 | Kobayashi et al. | |
| 7,225,746 B2 * | 6/2007 | Kobayashi et al. | 110/345 |
| 2004/0074426 A1 | 4/2004 | Kobayashi et al. | |
| 2010/0319594 A1 * | 12/2010 | Campbell et al. | 110/341 |

FOREIGN PATENT DOCUMENTS

| | | |
|---|---|---|
| JP | 61250417 A | 11/1986 |
| WO | 9821524 A2 | 5/1998 |

* cited by examiner

METHOD AND DEVICE FOR COMBUSTION OF SOLID FUEL

The present invention relates to a method and a device for combustion of solid phase fuel. More precisely, the invention relates to such combustion in a burner device using an oxidant with high oxygen concentration.

When conventionally combusting solid phase fuel in industrial burners, a pneumatic system is often used, comprising a carrier gas for conveying the solid phase fuel from an inlet to the place for combustion. For example, the fuel may be in the form of a powder, such as pulverized coal, and may be impelled by the motion of the carrier gas. Frequently, the carrier gas is constituted by air or nitrogen. Such combustion systems may for example be used for heating industrial furnaces.

One problem with such an arrangement is that the carrier gas constitutes a substantial part of the gas flow in the combustion device. Consequently, large amounts of ballast gas, for example in the form of nitrogen, must be heated, which leads to deteriorated efficiency.

Furthermore, it would be desirable to use solid phase fuels together with oxyfuel combustion devices, in other words such devices where the oxidant has a large oxygen concentration. One problem with such combustion is that flame temperatures locally become very elevated. In combination with the large amounts of nitrogen present in the combustion zone, this results in elevated levels of $NO_x$ in the combustion gases, something which is not desirable because of, among other so things, regulatory and environmental concerns. At the same time, it has proven to be very difficult to adapt a conventional combustion device for solid phase fuel so that dilution of the fuel with furnace gases can take place, for the purpose of achieving a so called flameless combustion, that is combustion with such a diffuse combustion zone so that a visible flame is essentially absent, and thereby achieving lower combustion temperatures.

Thus, it would be desirable to achieve a way to efficiently combust solid phase fuel the combustion products of which contains low levels of $NO_x$.

It would also be desirable to achieve a way to combust solid phase fuel by the use of which the levels of formed CO may be controlled.

The present invention solves the above described problems.

Thus, the invention relates to a method for combusting a solid phase fuel, where the fuel is caused, by the help of a non-pneumatic feeding means, to be fed to an inlet opening in a burner device, where the burner device is caused to comprise a first inlet for the oxidant through which an oxidant is caused to flow via a first supply conduit, and is characterised in that the first inlet for oxidant is caused to be arranged in the form of a first opening arranged by the inlet opening, through which the oxidant is caused to flow out, through a burner pipe and out through a burner orifice to a combustion space, so that the oxidant by ejector action causes the fuel to be conveyed through the burner pipe and out through the burner orifice, and in that water vapour is added to the oxidant before the oxidant reacts with the fuel.

Furthermore, the invention relates to a device of the type and with essentially the features according to claim 14.

Figure 2:
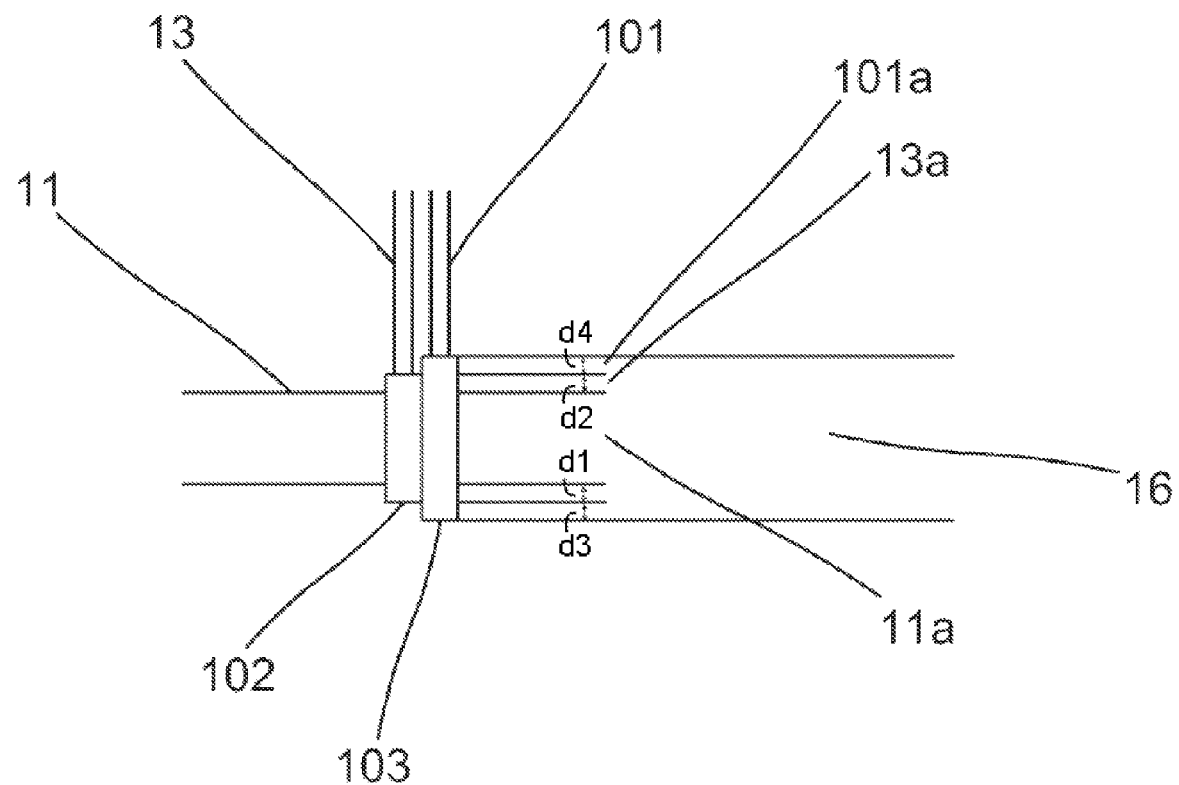

The invention will now be described in detail, with reference to exemplifying embodiments of the invention and to the appended drawings, where:

FIG. 1 is a schematic view of a burner device according to the present invention; and FIG. 2 is a schematic view of a preferred design of a detail of the burner device according to the present invention.

FIG. 1 shows a burner device 10 according to the present invention, suitable for applying a method according to the present invention. The burner device 10 is mounted in the wall of an industrial furnace 20, and is directed so that a combustion space 18 associated with the burner device 10 is arranged in the heated volume 21 of the furnace 20. The industrial furnace 20 may be used for heating various materials, for example glass, steel, non ferrous metals and ceramic materials. Moreover, it is possible to use a burner device according to the present invention in for example heating, electric generation or thermal power plants, in which the heat from the burner device 10 is used, for example, as municipal heating and/or is converted into electricity.

A feeding means 11 in the form of a screw feeder or corresponding is arranged to feed a predetermined amount of solid phase fuel, such as for example pulverized coal, to an inlet opening 11a, arranged inside the burner device 10. The feeding means 11 may also be designed in other ways, but it is preferred that it is not pneumatically driven.

A supply system 12 for oxidant is branched in a first supply conduit 13, a second supply conduit 14 and a third supply conduit 15 for oxidant. A control device 19, which is conventional per se, is arranged to control the supply of oxidant through the supply system 12.

The first supply conduit 13 opens out into a first inlet 13a, arranged in the form of an opening surrounding the inlet opening 11a. The inlet opening 11a and the opening 13a debouche in one and the same burner pipe 16. In other words, the oxidant flows out through the opening 13a and the fuel is conveyed to the inlet opening 11a, and consequently oxidant and fuel meet in the burner pipe 16. According to a preferred embodiment, the opening 13a surrounds the inlet opening 11a in a symmetric manner, preferably in the form of a circular symmetric, narrow opening running peripherally along the inlet opening 11a.

According to another preferred embodiment, the opening 13a surrounds the inlet opening 11a in a manner which is not circular symmetric, so that the opening 13a is wider or larger at the lower part of the inlet opening 11a (i.e., at d1) than at its upper part (i.e., at d2 so that d1>d2). This will permit a larger volume of oxidant per time unit to flow through the opening 13a at the lower part of the inlet opening 11a, which in turn makes it possible to maintain a lower feed velocity of the fuel and with the same direction of the resulting flame in the furnace 20.

The opening 13a may surround the inlet opening 11a completely, alternatively surround the inlet opening 11a in the form of a number of holes, apertures or the like, so that the opening 13a does not completely circumscribe the inlet opening 11a.

The burner pipe 16 runs up to a burner orifice 17, which faces out towards the combustion space 18. According to a very preferred embodiment, the length of the burner pipe 16 is between about 4 and 6 times the length of the inner diameter of the inlet opening 11a, preferably about 5 times. This relationship has proved to result in very attractive combustion properties in the burner device 10.

The oxidant flows out through the opening 13a with a high velocity, preferably with at least 100 m/s, but more preferably with at least the speed of sound. This creates an ejector action, bringing the solid phase fuel with it. Thereafter, the mixture of oxidant and fuel, which fuel is dispersed and transported by the help of the flow of oxidant, flows along the burner pipe 16 up to, and out through, the orifice 17.

Towards the end of the burner pipe 16, there is a gradually increasing constriction 16a, causing the inner diameter of the burner pipe 16 at the orifice 17 to be between 2% and 30% smaller than at the opening 13a. The dimensions for the inlet opening 11a, the opening 13a, the burner pipe 16 and the constriction 16a are adapted for the specific application, especially regarding the power of the burner device 10. Specifically, the constriction 16a is dimensioned for achieving a specific, final velocity with which the mixture of oxidant and fuel flows out through the orifice 17. Among other things, this velocity depends on the geometry of the combustion space 18 and desired combustion characteristics, and is chosen on the basis of present conditions and purposes.

Thus, the solid phase fuel is conveyed up to the combustion space 18 with no need for a separate, inert carrier gas. Instead, the oxidant itself is used as a carrier gas. Consequently, there is no need for heating any ballast material, which increases the efficiency of the burner device 10.

Furthermore, according to a preferred embodiment, the amount of oxidant per time unit that flows out through the opening 13a is understoichiometric in relation to the amount of fuel which is caused to be fed up to the inlet opening 11a. In other words, the combustion mixture flowing through the burner pipe 16 is understoichiometric.

As the mixture approaches the combustion space 18, it may ignite already in the burner pipe 16, because of the radiant heat from the combustion space 18. However, this combustion reaction will lead to the forming of CO, among other things and at the expense of the forming of $NO_x$, because of the above described understoichiometric relation and the fact that no additional nitrogen gas is supplied in the form of carrier gas.

According to a preferred embodiment, additional oxidant flows, via the second supply conduit 14, out through one or several other inlets 14a for oxidant. This or these other inlets 14a are arranged facing the combustion space 18 and in immediate vicinity of the burner orifice 17. The expression "in immediate vicinity of the burner orifice 17" herein means that the inlet or inlets 14a and the burner orifice 17 are arranged so near one another that the combustion mixture and the additional oxidant are intermixed essentially instantly to form a single, connected flame in the combustion space 18.

The amount additional oxidant flowing out through the inlet or inlets 14a is chosen so that the total amount supplied oxidant and the amount supplied fuel achieve stoichiometric equilibrium.

In the flame thus formed in the combustion space 18, fuel that has not yet been consumed in the combustion mixture flowing out from the burner pipe 16 is consumed, but so are also incompletely oxidised compounds such as CO. This combustion may take place at a comparatively low, controlled temperature, since certain recirculation with the furnace atmosphere arises in the flame because of the oxidant additionally supplied via the inlets 14a. This leads to an increase of the flame size and it becoming more diffuse, which lowers the maximum combustion temperature and thereby also the forming of $NO_x$ compounds.

Furthermore, it is preferred that the additional oxidant flows out through the inlet or inlets 14a with a velocity of at least the speed of sound. This leads to the recirculation strongly increasing in the combustion space 18, with the above indicated advantages.

According to yet another preferred embodiment, additional oxidant flows, via the third supply conduit 15, out through one or several, third inlets 15a for oxidant, arranged facing towards the combustion space 18 and arranged at a distance from the burner orifice 17.

The expression "at a distance from the burner orifice 17" herein means that the inlet or inlets 15a and the burner orifice 17 are arranged at such a distance from each other that the additional oxidant, flowing out from the inlet, or inlets 15a, does not instantly mix with the combustion mixture flowing out through the burner orifice 17, but that these two or more streams are only mixed some distance out into the combustion space 18 as seen from the burner orifice 17.

In certain applications, it is preferred that the inlet or inlets 15a are arranged essentially parallel to the longitudinal axis of the burner pipe 16.

In other applications, especially where the burner device 10 is comparatively large and the furnace space 21 is comparatively limited, it is preferred that the inlet or inlets 15a are arranged so that the additional oxidant flows out into the combustion space 18 at an angle in comparison to the direction in which the combustion mixture flows out from the orifice 17, so that the streams obtain a common point of intersection some distance out from the orifice 17.

According to a preferred embodiment, the inlet or inlets 15a are so positioned, and angled in relation to the longitudinal axis of the burner pipe 16, that a single connected flame is formed in the combustion space 18.

Moreover, it is preferred that the additional oxidant flows out through the inlet or inlets 15a at a velocity of at least the speed of sound. This leads to recirculation being strongly increased in the combustion space 18, in applicable cases in and around the point at which the streams of combustion mixture and additional oxidant meet. As a consequence, the flame becomes even more diffuse, with lower top temperatures, and in this way it is possible to obtain flameless combustion, something which among other things results in a smaller production of $NO_x$ compounds. Also, the heat from the combustion reaction is distributed more evenly in the space 18.

It is also possible to let additional oxidant flow out through a combination of one or several inlets 14a, arranged in immediate vicinity of the burner orifice 17, at the same time as one or several inlets 15a, arranged at a distance from the burner orifice 17, as long as the totally supplied oxidant essentially stands in stoichiometric equilibrium with the supplied fuel. The relation between the amount of oxidant in the oxidant streams through the inlets 14a, 15a, the mutual geometrical position of the inlets and their respective slants, their respective flow velocities, etc., are determined from case to case depending on the present conditions and purposes.

In case a smaller, better defined flame is desired, the inlet is or inlets 14a are used primarily. If, on the other hand, a flameless combustion is desired, the inlet or inlets 15a are used primarily.

It is also possible to let the supply conduits 13, 14, 15 be connected to one or several supply systems, whereby different types of oxidant may be supplied through the opening 13a and the additional inlets 14a, 15a, respectively. In this case, the control, device 19 may be arranged to control the supply of oxidant to the various supply conduits 13, 14, 15, alternatively several different control devices 19 may be used in parallel.

By the use of a burner device 10 according to the present invention, it is possible to make use of a gas with larger oxygen content than for example air as oxidant, without this resulting in too high local combustion temperatures. Thus, it is preferred that the oxidant is comprised of at least 80 percentages by weight oxygen, more preferably at least 95 percentages by weight oxygen. This results in the efficiency of the burner device 10 increasing. Despite this, the amount of $NO_x$ formed is, according to what has been said, not increased, since the combustion temperature is held down by the aid of the recirculation in the combustion space 18 described above.

According to the invention, water vapour is added to the oxidant before the oxidant reaches a point towards the end of the burner pipe 16 or in the combustion space 18 where it commences the reaction with the fuel. This takes place by the use of a supply system that may be the same as the above described supply system 12 for oxidant or an additional supply system.

As has been mentioned above, during combustion of solid phase fuel, there is formed among other things CO, but also $H_2O$ and $CO_2$. Especially for solid phase fuels with low nitrogen contents, such as for example cole char, relatively large amounts of CO are formed. It is often desirable to minimise the proportion of CO in the flue gases. By adding water vapour to the combustion reaction, hydrogen gas and carbon dioxide will be formed according to a so called shift reaction:

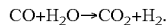

$$CO+H_2O \rightarrow CO_2+H_2.$$

Thus, as a residual product hydrogen is formed, which may be collected and exploited for other purposes.

The shift reaction will take place in a step downstream of the flame, in other words essentially after the fuel has reacted with the oxidant to form $CO_2$ and $H_2O$. Thereby, the reaction will take place to a certain extent also with no added water vapour, since water of course is formed during the combustion itself. However, water is formed in too small amounts to be able to transform more than a small part of the carbon monoxide to carbon dioxide in the downstream shift reaction. The amount of water vapour added depends, among other things, on the type of fuel being used. It is preferred that an amount of water vapour per time unit, is added which is at least so large so that a good process of gasification of the current fuelt is achieved, and which at the same time is no larger than what is necessary to render it possible for substantially all CO to be converted into $CO_2$. Herein, "substantially all" CO means that substantially all the CO that is convertible to $CO_2$ through the above shift reaction is converted, taking into consideration that a certain amount of CO will always escape conversion due to the chemical preconditions.

Since the water vapour is added already before the combustion itself takes place, so that water vapour will be present in the flame, it will absorb a certain share of the thermal energy which is generated in the combustion reaction, which decreases flame temperature and therefore also the formation of $NO_x$.

Moreover, the advantage is achieved that the added water vapour cools the burner 10, which is especially advantageous during operation with oxygen enriched oxidants, since the temperature in the burner itself can become high in these cases, and thereby the risk of damages on the burner 10 increases.

Simultaneously, the water vapour takes part in the shift reaction in the downstream step, in which the absorbed thermal energy therefore comes to effective use. This way, the heating of the water vapour will not constitute a thermal loss, which is the case when an inert ballast compound, such as for example nitrogen in the case of air burners, is used.

According to the invention, it is possible to add water vapour to the oxidant already before the oxidant is transported into the burner pipe 16 at the inlet opening 11a for fuel. However, FIG. 2 illustrates a preferred embodiment regarding the supply of water vapour. FIG. 2 merely shows, in simplified form and in cross-section, a detail of the burner device 10 illustrated in FIG. 1, but it shares reference numerals with FIG. 1 for corresponding parts.

In addition to the inlet 13a for oxidant, the burner device 10 also comprises an inlet 101a for water vapour arranged by the inlet opening 11a for fuel. Through this inlet 101a for water vapour, water vapour is let in, and there meets the stream of oxidant streaming out through the first inlet 13a for oxidant, before the oxidant has time to react with the fuel. Such an arrangement will allow the stream of water vapour to be used to affect how the stream of oxidant behaves in the burner pipe 16, which gives increased flexibility when designing the burner device 10.

Distribution devices for oxidant 102 and water vapour 103, respectively, are designed so that oxidant and water vapour are conveyed into the burner pipe 16, via openings 101a, 13a in a suitable manner.

It is preferred that both openings 13a, 101a are arranged very close to the inlet opening 11a for fuel, whereby water vapour, oxidant and fuel meet in the burner pipe 16 in essentially one and the same location.

Especially good results can be achieved if the inlet 101a for water vapour is designed as an opening which surrounds the inlet for oxidant 13a, so that the stream of water vapour through the burner pipe 16 will surround the stream of oxidant through the burner pipe 16. In other words, the stream of water vapour will form a tube-shaped body, through which the oxidant streams. According to an especially preferred embodiment, the water vapour, the oxidant and the fuel, which is carried via ejector action by the oxidant, form three essentially concentrical, tube-shaped bodies, where the fuel is carried in the middle, followed by the oxidant and thereafter the water vapour furthest out towards the inner walls of the burner pipe 16.

As a consequence, the oxidant, being supplied at high velocity and carrying with it the solid phase fuel, due to the decreased friction arising since there is no longer any direct contact with the inner walls of the burner pipe 16, and with the help of the forward motion of the water vapour, can stream more unimpededly through the burner pipe 16 and therefore more efficiently can carry the fuel with it. At the same time, the risk decreases for the oxidant that streams out of the opening 13a to rapidly expand in the burner pipe 16 due to the pressure drop across the opening 13a, thereby to create undesired turbulence therein.

To achieve these advantages, it is not necessary that the water vapour streams out through the opening 101a with a velocity which is as high as the velocity at which the oxidant streams out through the opening 13a. Therefore, it is preferred that the velocity of the water vapour is lower than the velocity of the oxidant. Suitable water vapour outlet velocities have been found to be between about 2 times and about 10 times lower than the oxidant outlet velocity.

The opening 101a for water vapour may surround the opening for oxidant 13a in different ways, such as in the form of a symmetrical, possibly circular symmetrical, opening running periferically along the opening 13a, or in a way which is not circular symmetric, so that the opening 101a is broader or larger at the lower part of the opening 13a (at d3) than at its upper part (at d4 so that d3>d4). This allows a larger volume water vapour per time unit to stream through the opening 101a at the lower part of the opening 13a in comparison to at its upper part, which in turn, possibly in combination with such a non-symmetrical design of the opening 13a as described above, makes lower feeding velocities of the fuel possible while preserving the direction of the resulting flame in the furnace 20.

The opening 101a may surround the opening 13a completely, alternatively surround the opening 13a in the form of a number of holes, slits or the like, so that the opening 101a does not completely encompasses the opening 13a.

The supply of water vapour may be controlled by the same control device 19 that controls the supply of oxidant, or a separate control device (not shown).

Above, preferred embodiments have been described. However, it is apparent to the skilled person that many modifications may be made to the described embodiments without departing from the idea of the invention. Therefore, the invention shall not be limited to the described embodiments, but may be varied within the frame of the appended claims.

The invention claimed is:

1. A device for combustion of a solid phase fuel, comprising:
    a burner device (1) comprising a burner pipe (16) with an inlet opening (11a) and a burner orifice (17) adjacent a combustion space (18); and
    a non-pneumatic feeding means (11) arranged to feed a solid phase fuel to the inlet opening (11a),
    wherein the burner device further comprises
    i) a first supply conduit (13) with a first oxidant inlet (13a) arranged adjacently surrounding the inlet opening (11a) such that a stream of the oxidant fed from the first supply conduit (13) exits the first oxidant inlet (13a) surrounding the solid phase fuel being fed to the inlet opening (11a) so that the stream of oxidant surrounding the solid phase fuel is fed through the burner pipe (16) and out through the burner orifice (17) into the combustion space (18),
    ii) a supply conduit (101) with a water vapour inlet in the form of a second opening (101a) arranged adjacently surrounding the first oxidant inlet (13a) such that a stream of water vapour fed from the supply conduit (101) exits the second opening (101a) surrounding the stream of the oxidant exiting the first oxidant inlet (13a), and
    a supply system (12;19), arranged to supply the oxidant via the first supply conduit (13) and through the first oxidant inlet (13a), so that the stream of water vapour exits the second opening (101a) surrounding the stream of the oxidant exiting the first oxidant inlet (13a), and with the oxidant to creating an ejector action to cause the fuel to be conveyed through the burner pipe and out through the burner orifice such that the stream of the oxidant exits the first oxidant inlet (13a) surrounding the solid phase fuel, with the water vapour, the oxidant, and the solid phase fuel meeting in the burner pipe in essentially one and the same location and with the water vapour meeting and being added to the oxidant before the oxidant reacts with the fuel.

2. The device according to claim 1, wherein the first oxidant inlet (13a) surrounds the inlet opening (11a) in a non circular symmetric manner, so that the first oxidant inlet (13a) is larger at a lower part (d1) of the inlet opening (11a) than at an upper part (d2) of the inlet opening (11a).

3. The device according to claim 1, wherein the second opening (101a) surrounds the first oxidant inlet (13a) in a non circular symmetric manner, so that the second opening (101a) is larger at the lower part (d3) of the first oxidant inlet (13a) than at the upper part (d4) of the first oxidant inlet (13a).

4. The device according to claim 1, where the supply system (12;19) is arranged to control the supply of water vapour and oxidant so that the water vapour streams out through the second opening (101a) at a velocity which is lower than velocity with which the oxidant streams out through the first oxidant inlet (13a).

5. The device according to claim 1, wherein the supply system (12;19) is arranged to control the supply of oxidant so that the oxidant streams through the first oxidant inlet (13a) at a velocity of at least 100 m/s.

6. The device according to claim 1, wherein the supply system (12;19) is arranged to control the amount of oxidant per time unit which streams out through the first oxidant inlet (13a) so that this is understoichiometric in comparison to the amount of fuel which is fed to the inlet opening (11a), and in that the supply system (12;19) is arranged to supply an additional stream of oxidant, via at least one additional supply conduit (14;15), out through at least one additional outlet (14a;15a) for oxidant, arranged towards the combustion space (18), so that the total amount of supplied oxidant stoichiometrically can correspond to the amount of supplied fuel.

7. A method for combusting a solid phase fuel, comprising:
    causing the solid phase fuel, by help of a non-pneumatic feeding means (11), to be fed to an inlet opening (11a) at a burner pipe (16) with an inlet opening (11a) and a burner orifice (17) adjacent a combustion space (18) in a burner device (10), the burner device (10) further comprised of
    i) a first supply conduit (13) with a first oxidant inlet (13a) arranged adjacently surrounding the inlet opening (11a) such that a stream of the oxidant fed from the first supply conduit (13) exits the first oxidant inlet (13a) surrounding the solid phase fuel being fed to the inlet opening (11a) so that the stream of oxidant surrounding the solid phase fuel is fed through the burner pipe (16) and out through the burner orifice (17) into the combustion space (18), and
    ii) a supply conduit (101) with a water vapour inlet in the form of a second opening (101a) arranged adjacently surrounding the first oxidant inlet (13a) such that a stream of water vapour fed from the supply conduit (101) exits the second opening (101a) surrounding the stream of the oxidant exiting the first oxidant inlet (13a); and
    while the stream of water vapour exits the second opening (101a) surrounding the stream of the oxidant exiting the first oxidant inlet (13a), using the oxidant to create an ejector action to cause the fuel to be conveyed through the burner pipe and out through the burner orifice such that the stream of the oxidant exits the first oxidant inlet (13a) surrounding the solid phase fuel, with the water vapour, the oxidant, and the solid phase fuel meeting in the burner pipe in essentially one and the same location and with the water vapour meeting and being added to the oxidant before the oxidant reacts with the fuel.

8. The method according to claim 7, wherein a first opening (d1) of the first oxidant inlet (13a) is larger at a lower part of the inlet opening (11a) than a second opening (d2) of the first oxidant inlet (13a) at an upper part of the inlet opening (11a).

9. The method according to claim 7, wherein the second opening (101a) is larger at a lower part of the first oxidant inlet (13a) than at an upper part of the first oxidant inlet (13a).

10. The method according to claim 7, wherein the water vapour is caused to stream out through the second opening (101a) at a velocity which is lower than a velocity with which the oxidant is caused to stream out through the first oxidant inlet (13a).

11. The method according to claim 7, wherein the oxidant is caused to stream out through the first oxidant inlet (13a) at a velocity of at least 100 m/s.

12. The method according to claim 11, wherein the oxidant is caused to stream out through the first oxidant inlet (13a) at a velocity of at least sonic velocity.

13. The method according to claim 7, wherein the amount of oxidant per time unit which is caused to stream out through the first oxidant inlet (13a) is caused to be understoiciometric in comparison to the amount of fuel which is caused to be fed to the inlet opening (11a).

14. The method according to claim 13, wherein additional oxidant is caused to stream, via a second additional supply conduit (14), out through a second and additional outlet (14a) for oxidant, arranged towards the combustion space (18) and in an immediate vicinity of the burner orifice (17).

15. The method according to claim 14, wherein additional oxidant is caused to stream, via a third additional supply conduit (15), out through a third and additional outlet (15a) for oxidant, arranged towards the combustion space (18) and at a distance from the burner orifice (17).

16. The method according to claim 7, wherein the oxidant is caused to comprise at least 80 percentages by weight oxygen.

\* \* \* \* \*

UNITED STATES PATENT AND TRADEMARK OFFICE
CERTIFICATE OF CORRECTION

PATENT NO.        : 8,689,708 B2
APPLICATION NO.   : 12/988858
DATED             : April 8, 2014
INVENTOR(S)       : Ekman et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 712 days.

Signed and Sealed this
Twenty-ninth Day of September, 2015

Michelle K. Lee
*Director of the United States Patent and Trademark Office*